United States Patent
Feichtinger

(10) Patent No.: US 6,257,907 B1
(45) Date of Patent: Jul. 10, 2001

(54) ANGULAR POSITION ENCODER

(75) Inventor: Kurt Feichtinger, Palling (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 09/532,558

(22) Filed: Mar. 22, 2000

(30) Foreign Application Priority Data

Mar. 24, 1999 (DE) .................................. 199 13 262

(51) Int. Cl.[7] .................................................. H01R 13/44
(52) U.S. Cl. ............................................. 439/135; 439/144
(58) Field of Search ...................................... 439/135, 144, 439/148, 345, 660, 133, 149, 299, 300, 347, 352, 372, 488, 489

(56) References Cited

U.S. PATENT DOCUMENTS

| | | | |
|---|---|---|---|
| 1,819,214 | * 8/1931 | Dorn | 439/135 |
| 3,811,104 | * 5/1974 | Caldwell | 439/135 |
| 4,556,264 | * 12/1985 | Tamaka | 439/135 |
| 4,806,112 | * 2/1989 | Roberts et al. | 439/135 |
| 4,922,069 | * 5/1990 | Huizenga | 439/144 |
| 4,979,209 | * 12/1990 | Collins et al. | 439/144 |
| 5,464,351 | * 11/1995 | Oka | 439/144 |

FOREIGN PATENT DOCUMENTS

| | | |
|---|---|---|
| 195 43 372 | 5/1997 | (DE) . |
| 43 04 032 | 7/1998 | (DE) . |

* cited by examiner

Primary Examiner—Brian Sircus
Assistant Examiner—J. I. Duverne
(74) Attorney, Agent, or Firm—Kenyon & Kenyon

(57) ABSTRACT

An angular position encoder having a connecting cable (7) that is mounted simply and reliably is described. The cable (7) is connected so that it is relieved of strain. The connecting cable is clamped by a holder (10) on the housing (8). The housing (8) includes a cut-out (9) which makes a connector (6) accessible for attachment of the cable (7). The cut-out (9) can be sealed by a cover (12), and the cover (12) securely locks the holder (10) in its position.

8 Claims, 3 Drawing Sheets

ANGULAR POSITION ENCODER

The present invention relates to an angular position encoder having a connecting cable that is mounted simply, reliably, and in a strain-free manner on the encoder.

DESCRIPTION OF RELATED ART

Angular position encoders are used for measuring the rotary motion of a shaft over one or a plurality of revolutions, and are also referred to as rotary position transducers. The rotary motion is detected incrementally or absolutely. In conjunction with gear racks or worm-gear spindles, angular position encoders can also be used to measure linear motion.

An operating voltage is supplied via electrical connecting cables to the angular position encoder, and the measuring signals are tapped off, and routed to a processing electronic device. To facilitate attachment of different types of connecting cables to an angular position encoder, a connector is provided at the angular position encoder. Configuring the connector inside the housing of the measuring device results in an especially compact design, that ensures that the connector is protectively housed.

An angular position encoder of this kind is known from German Patent 43 04 032 C2. To make the connector accessible inside the housing to connect the cable, provision is made at the housing for a cut-out segment, which can be covered by a swing-mounted cap. In the covered position, the cap provides mechanical strain relief for the connecting cable.

One drawback of this angular position encoder is that the strain relief is effective exclusively in the closed state of the cap, and a tensile force at the cable can easily open the cap.

German Patent Application 195 43 372 Al, describes an angular position encoder where provision is made inside the housing for a connector for connecting a cable, as well as for a strain relief device. The connector and the strain relief device are accessible from the outside, once the cover is opened.

A disadvantage of this device, in turn, is that a tensile force at the cable can cause the cover to open quite easily.

SUMMARY OF THE INVENTION

The present invention is an angular position encoder which has a connector that can be covered in order to securely attach a cable, and which features simple cable installation and reliable strain relief.

In one aspect, the invention is an angular position encoder comprising a housing having at least one opening, a cover for closing the opening when in a closed position, a connector with a stationary part attached to the housing within the opening and a mating component for electrically connecting a connecting cable, and a holder adapted for securing a portion of the connecting cable to the housing, the holder relieving a strain in the connecting cable, wherein the cover when in the closed position covers the connector making it inaccessible, and is locked in the closed position between the housing and the holder, such that the holder is fixed in position.

The angular position encoder designed in accordance with the present invention provides reliable strain relief before the connecting cable is attached, and includes an housing of the angular position encoder that can be covered without necessitating additional connecting elements and the tools required for them. Other advantages will be apparent from the following description.

BRIEF DESCRIPTION OF THE DRAWINGS

The invention is described with reference to the drawings below. In the drawings.

DETAILED DESCRIPTION OF THE EMBODIMENTS OF THE INVENTION

Figure 1:
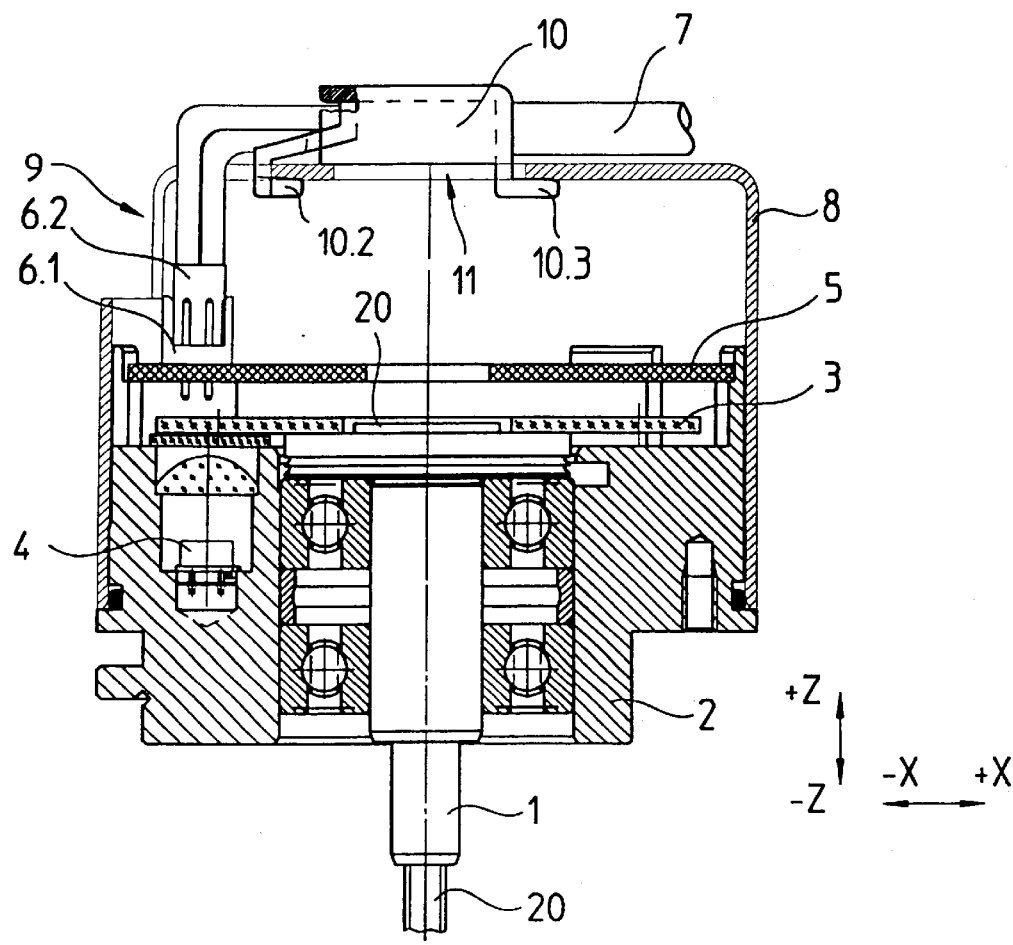
FIG. 1 shows a cross section of an angular position encoder according to the invention.
Figure 2:
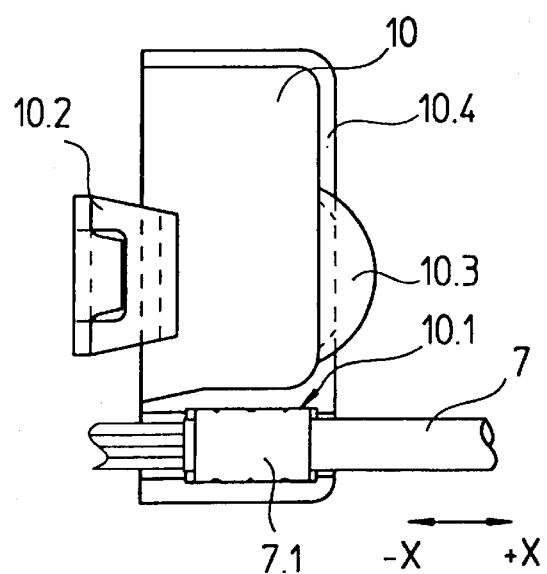
FIG. 2 shows a holder of the angular position encoder, for providing strain relief.
Figure 3:
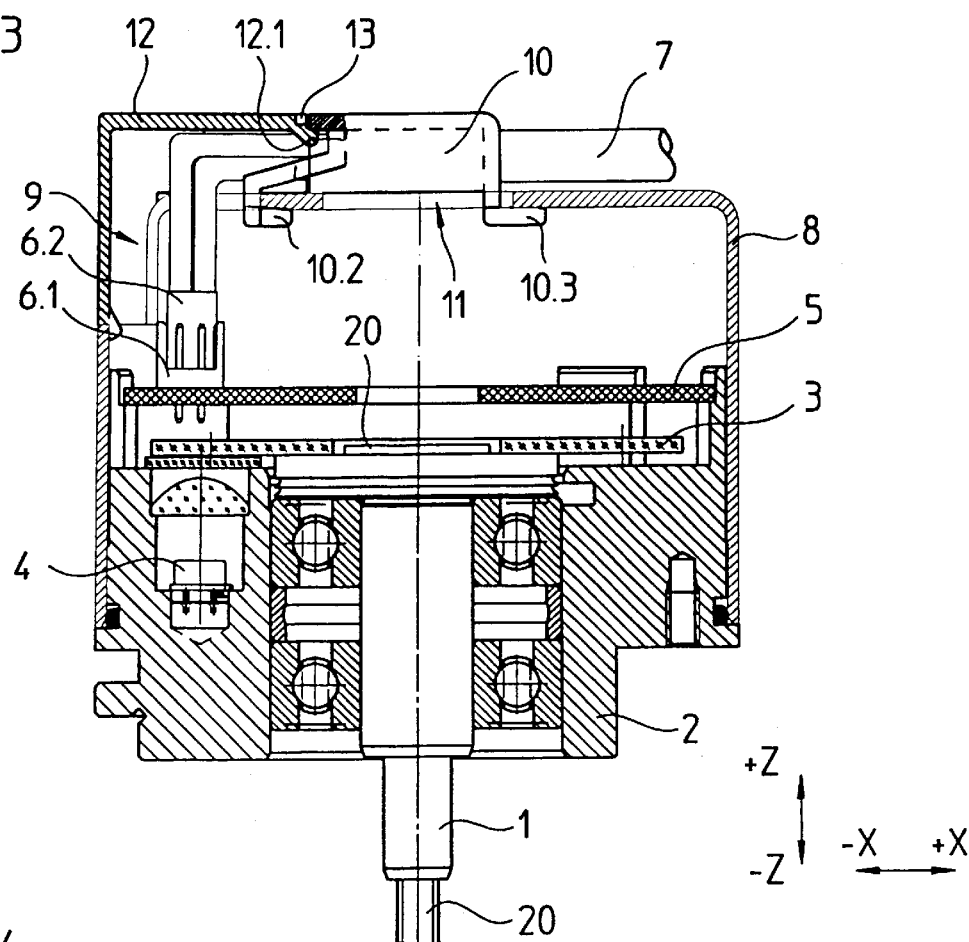
FIG. 3 shows the angular position encoder in accordance with FIG. 1, completely sealed.
Figure 4:
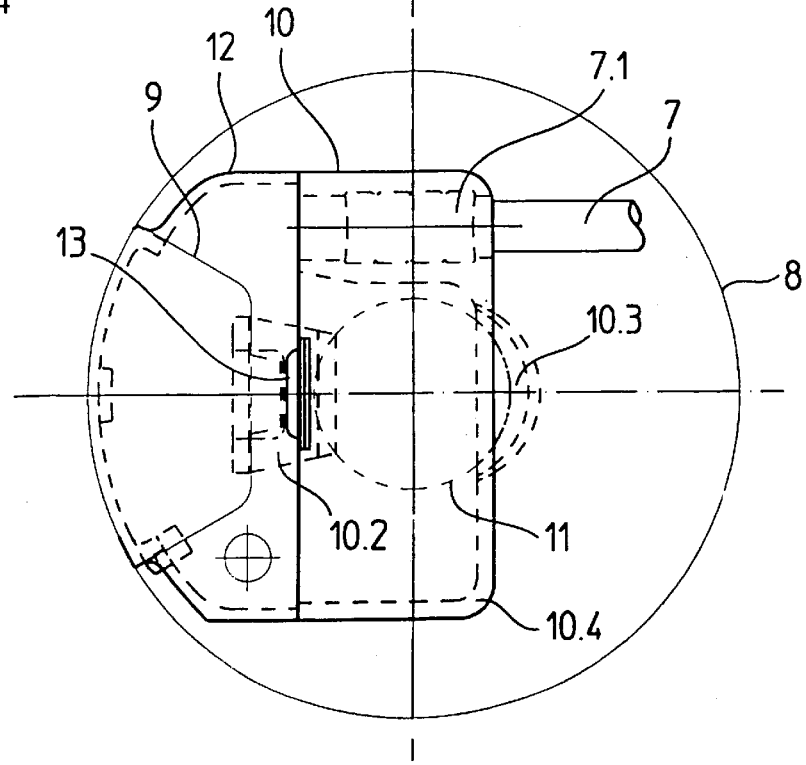
FIG. 4 shows a plan view of the angular position encoder in accordance with FIG. 3.

The angular position encoder shown in FIGS. 1 to 4 has a shaft 1 for attachment to a body, whose angular position is to be measured. The connection between shaft 1 and the body whose motion is to be measured is implemented, as is generally known, as a clamping connection. For this, a screw 20, which is shown schematically, extends axially in hollow shaft 1, and is accessible from the rear of the measuring device.

Base member 2, also referred to as a stator or flange, is provided to enable direct attachment to another body. The body to be measured can be, for example, a motor shaft, and the other body can be a stationary motor housing.

In a generally known manner, shaft 1 is supported by base member 2, and an encoding disk 3 is secured to shaft 1. Alternatively, shaft 1 can drive one or a plurality of encoding disks via a gear unit. Encoding disk 3 can have an incremental and/or an absolute encoding, which for example can be scanned photoelectrically, magnetically, capacitively or conductively. In the illustrated example, ercoding disk 3 is scanned photoelectrically. For this, a light source 4 is provided, which radiates a light beam that is modulated by encoding disk 3 as a function of position. The modulated light arrives at detectors, which can be arranged on a circuit board 5. Also located on circuit board 5 is stationary part 6.1 of a connector 6. The corresponding part 6.2 of this connector 6 is secured to a connecting cable 7 leading to the outside.

A pot-shaped housing 8 is provided to protect circuit board 5 and connector part 6.1, which is secured over the periphery in clamping fashion to base member 2. Housing 8 can have a segmental cut-out 9, through which connector part 6.2 on the cable side can be run to stationary connector part 6.1, and is detachably securable thereto. Housing 8 can also be directly formed by base member 2.

To provide strain relief for connector part 6.2, cable 7 can be clamped by a holder 10 to housing 8. For this, holder 10 has a form-locking receptacle 10.1 for a region 7.1 of cable 7. This region 7.1 of cable 7 can be a crimp sleeve, by way of which the shield of cable 7 is electrically contacted. This crimp sleeve 7.1 is retained in clamping fashion in receptacle 10.1 of holder 10, radially over the periphery, and is pressed via holder 10 against a surface of housing 8, and thus electrically contacted by this housing.

Provision can be made, alternatively or additionally, in housing 8 for a form-locking receptacle for sleeve 7.1. The clamping-type fixation of holder 10 to housing 8 is implemented by two clips 10.2 and 10.3, which are pre-molded onto holder 10, and which, when inserted, engage on the lower side of housing plate 8. Holder 10 is then braced by surface regions 10.4 against the top side of housing plate 8. In a preferred embodiment, cable 7 is run in receptacle 10.1 in the +X direction, in which clips 10.2 and 10.3 extend, and in which holder 10 is also slipped onto housing plate 8 to be clamped in place. Thus, as a rule, the tensile force acting on cable 7 is effective in the direction +X that gives rise to the clamping action.

Clips 10.2 and 10.3 are spaced apart from one another in sliding direction +X. When holder 10 is mounted, one of clips 10.2 engages in cut-out 9 of housing 8, and the other clip 10.3 engages in another cut-out 11 of housing 8. This additional cut-out 11 is also used for actuating screw 20 in order to connect shaft 1 in a rotationally fixed fashion to a shaft to be measured.

After holder 10, together with cable 7, is fixed to housing 8, cut-out 9 is still freely accessible for attaching connector part 6.2. Cable 7 between clamped crimp sleeve 7.1 and connector part 6.2 is flexible, and can be installed in an easily visible and reliable fashion without applying a tensile force.

To cover cut-out 9 in a dust-proof manner, a cover 12 is provided, which is likewise secured only through clamping action. For this, cover 12 is braced on the one side against housing 8 or base member 2 and, on the other side, against holder 10. The bracing action is selected so that both parts 10 and 12 hold one another so as to be interlocked in self-locking fashion in the closed state.

Figure 5:
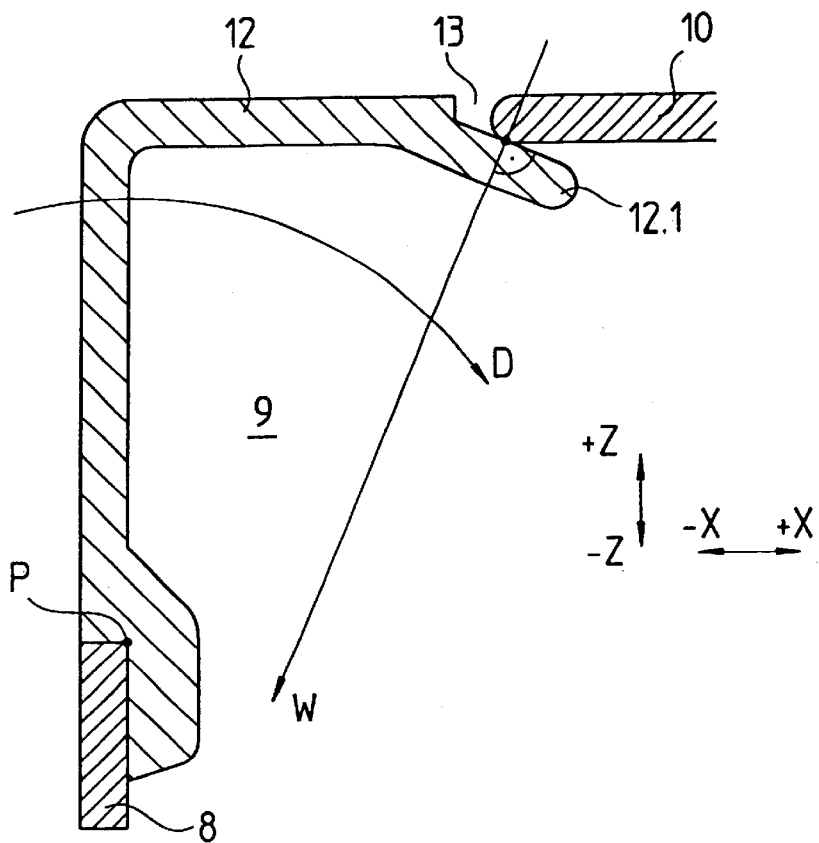
FIG. 5 shows an enlarged detail of the angular position encoder.

As shown in an enlarged representation in FIG. 5, cover 12 is fastened to housing 8 at point P, and is swivelled about support and pivot point P in arrow direction D, until nose portion 12.1 snaps in position on holder 10. The snap-fit connection is designed so that line of action W of the clamping force between cover 12 and holder 10, in the clamped state, acts in the direction of closing moment D to close the cover. With respect to pivot point P, bracing force W is a torque acting in a clockwise direction, thus in the direction of closing moment D. Nose portion 12.1 is thus braced against the bottom side of holder 10, but the bracing force cannot cause holder 10 to lift off, since holder 10 is secured by clips 10.2 and 10.3 in direction +Z.

In the event that a force acting upon cable 7 causes a displacement force to act upon holder 10, opposite to the +X direction, this displacement force reinforces the clamping force in the direction of W, and assists closing torque D. Thus, the design ensures that the two parts 10 and 12 are secured relatively to each other in a self-locking manner.

An important consideration is to ensure that holder 10 is braced against housing 8 in a plurality of directions +X, +Z, −Z, so that it remains fixed with respect to housing 8 in a plurality of degrees of freedom. To complete the assembly, holder 10 is fixed in the remaining direction −X, representing the remaining degrees of freedom, through cooperation with cover 12. Forces from holder 10 can only be exerted on cover 12 in direction −X, and holder 10 cannot be supported by housing 8 in that direction. It is this very force that acts in direction W of torque D required for the arresting action and, thus acts as a closing force.

To open cover 12, a slot 13 is placed between cover 12 and holder 10, into which a tool such as a screwdriver can be inserted, to exert an opening torque that acts against closing torque D.

To shield the interior of the angular position encoder from electromagnetic interference fields, holder 10 and cover 12 can be made of electrically conductive material, or at least of a material having an electrically conductive coating. Cover 12 and holder 10 are electroconductively connected via crimp sleeve 7.1 to the shield of cable 7, thus to a reference potential or ground.

Figure 6:
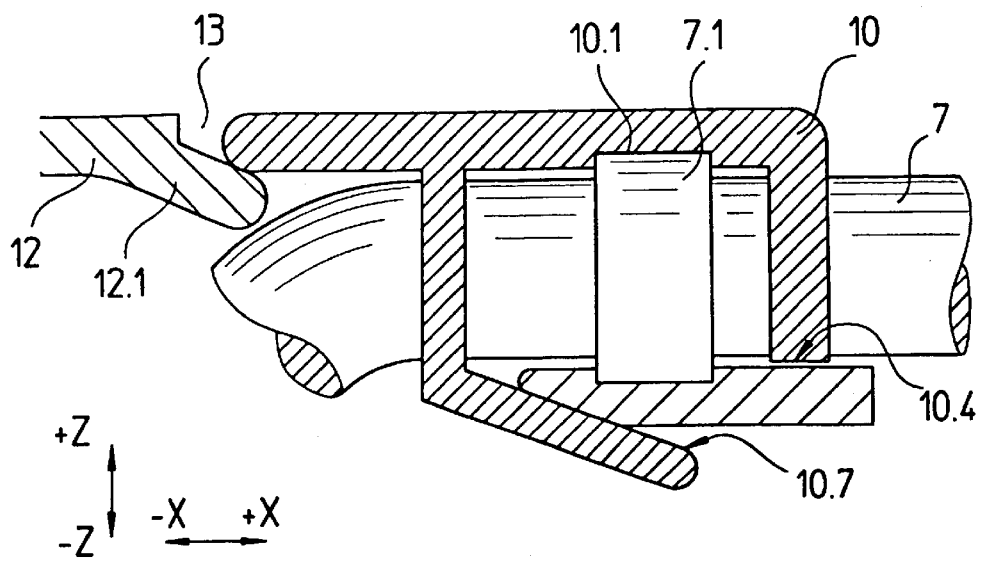
FIG. 6 shows a detail of an additional embodiment of the angular position encoder.

An alternative embodiment of holder 10 is illustrated in FIG. 6. In this embodiment, holder 10 is not braced exclusively by right-angled surfaces, but rather by an inclined surface 10.7, against housing 8. This surface 10.7 forms a stop face in the +X direction and, at the same time, in the +Z direction. In the −Z direction, holder 10, in turn, is braced by surface region 10.4.

The present invention is not limited to holder 10 being fixed in a plurality of degrees of freedom by sliding it onto housing 8. Alternatively, holder 10 can also be fixed in a plurality of degrees of freedom by twisting it onto housing 8. In this case, the degree(s) of freedom missing for a complete rigid fixation of the holder 10 are determined by cover 12. Cover 12 can, therefore, prevent holder 10 from being twisted off, because nose 12.1 is braced in the described manner against holder 10.

What is claimed is:

1. An angular position encoder comprising:

a housing having at least one opening;

a detachable cover for closing the opening when in a closed position;

a connector having a stationary part attached to the encoder within the opening and a mating component attached to a connecting cable for electrically connecting the connecting cable to the stationary part; and a detachable holder adapted for securing a portion of the connecting cable to the housing, the holder relieving a strain in the connecting cable, wherein the cover, when in the closed position, covers the connector to prevent access to the connector, the cover being locked in the closed position between the housing and the holder, such that the holder is fixed by the cover in position.

2. The angular position encoder as recited in claim 1, wherein the holder is braced against the housing in a plurality of directions and cooperates with the cover, so that said holder is fixed with respect to the housing and the cover in a plurality of degrees of freedom.

3. The angular position encoder as recited in claim 2, wherein the holder is fixed in all directions with respect to the housing by the cover.

4. The angular position encoder as recited in claim 2, wherein the holder is mounted by sliding onto the housing, and said holder is braced against the housing in the direction of sliding as well as in a direction perpendicular to the direction of sliding, and wherein the holder is fixedly supported by the cover opposite to the direction of sliding.

5. The angular position encoder as recited in claim 2, wherein the cover pivots about at least one point of the housing, and comprises a nose portion adapted to lock the cover in place by engaging the holder upon pivoting about the point, such that a force exerted by the holder on the cover retains the nose portion in a locked position.

6. The angular position encoder as recited in claim 1, wherein the portion of the connecting cable is clamped by the holder between the holder and the housing.

7. The angular position encoder as recited in claim 6, herein the clamped portion of the connecting cable is an electrically conductive sleeve electrically connected to a shield of the cable, to the holder and to the housing.

8. The angular position encoder as recited in claim 7, further comprising a receptacle of the holder partially wrapping around a periphery of the conductive sleeve.

* * * * *